United States Patent [19]
Toydoka et al.

[11] 3,723,187
[45] Mar. 27, 1973

[54] STORAGE BATTERY WITH HEATER

[76] Inventors: Tadao Toydoka, 16-6, Oshimacho-1-chome; Takeo Nishida, c/o Shizuhoso of 72, Nishi-5-chome, Honancho, both of Toyonaka; Hiroshi Ichihara, 1758, Kameino, Fujisawa, all of Japan

[22] Filed: Jan. 8, 1971

[21] Appl. No.: 105,004

Related U.S. Application Data

[62] Division of Ser. No. 708,676, Feb. 27, 1968, Pat. No. 3,623,916.

[30] Foreign Application Priority Data

| Mar. 2, 1967 | Japan | 42/18199 |
| Mar. 2, 1967 | Japan | 42/18214 |
| Mar. 2, 1967 | Japan | 42/18215 |
| Mar. 2, 1967 | Japan | 42/18216 |
| Mar. 2, 1967 | Japan | 42/18217 |
| Mar. 2, 1967 | Japan | 42/18218 |
| Mar. 2, 1967 | Japan | 42/18220 |
| Mar. 2, 1967 | Japan | 42/18221 |
| Mar. 2, 1967 | Japan | 42/18222 |
| Mar. 2, 1967 | Japan | 42/18223 |
| Mar. 8, 1967 | Japan | 42/20258 |
| Mar. 27, 1967 | Japan | 42/19752 |
| Mar. 27, 1967 | Japan | 42/19753 |

[52] U.S. Cl. ............................................136/161
[51] Int. Cl. ............................................H01m 45/02
[58] Field of Search................................136/161

[56] References Cited

UNITED STATES PATENTS 2,516,048  7/1950  Endress ..............................136/161

FOREIGN PATENTS OR APPLICATIONS 894,555  4/1962  Great Britain......................136/161

*Primary Examiner*—Donald L. Walton
*Attorney*—Stevens, Davis, Miller & Mosher

[57] ABSTRACT

A storage battery comprising electrode plate groups including anode plates and cathode plates, a battery casing for accommodating said electrode plate groups and electrolyte, a closure covering said battery casing, and face heaters so treated as to be of electrolyte-resistance and provided in said battery casing, wherein said electrolyte is effectively heated to prevent the electromotive force from being decreased due to a decrease in temperature of said electrolyte, thereby producing a constant electromotive force.

5 Claims, 22 Drawing Figures

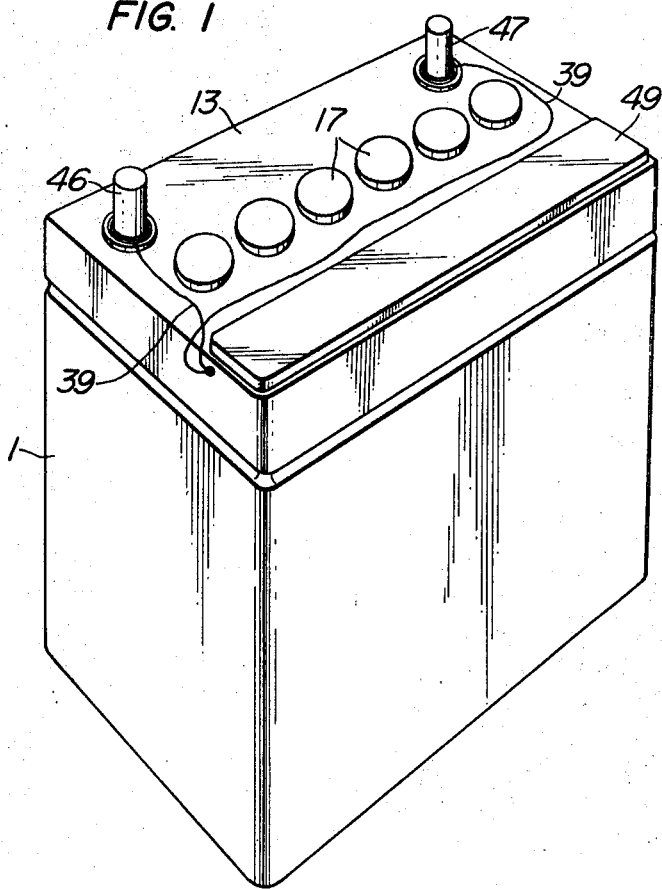

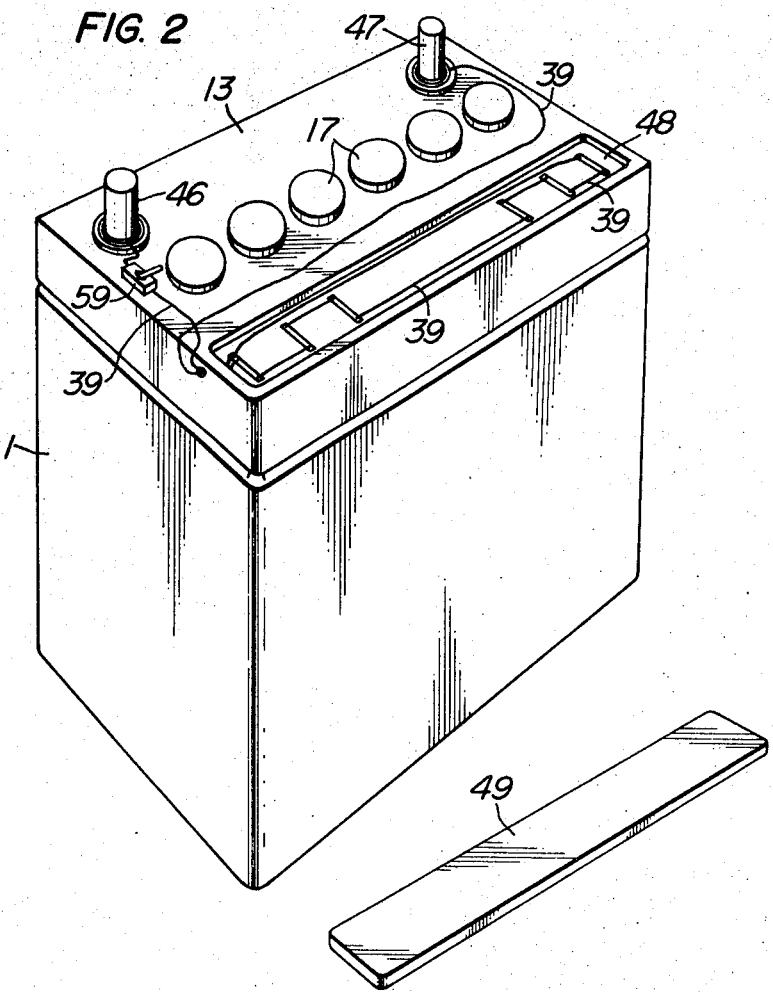

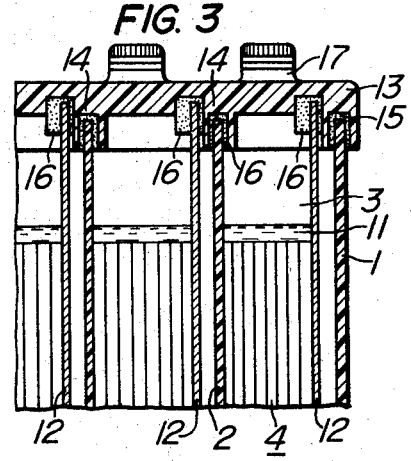
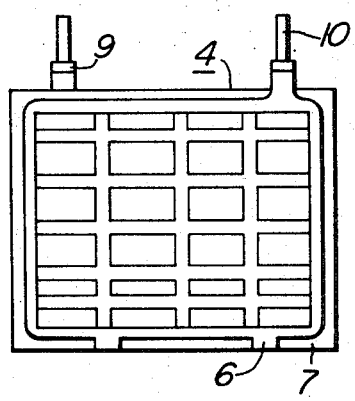
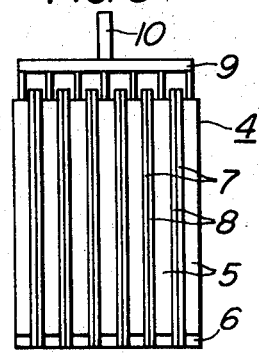
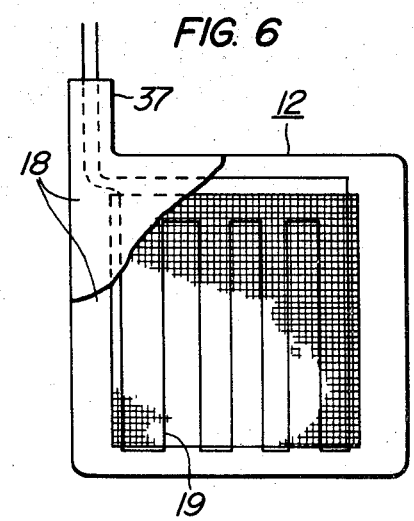
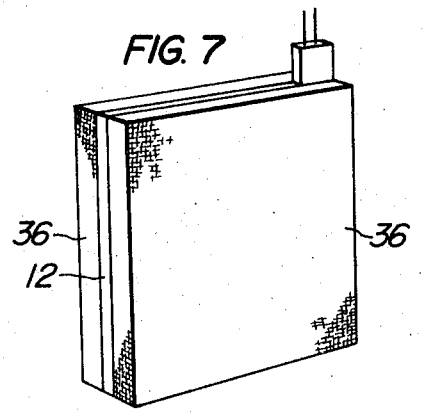

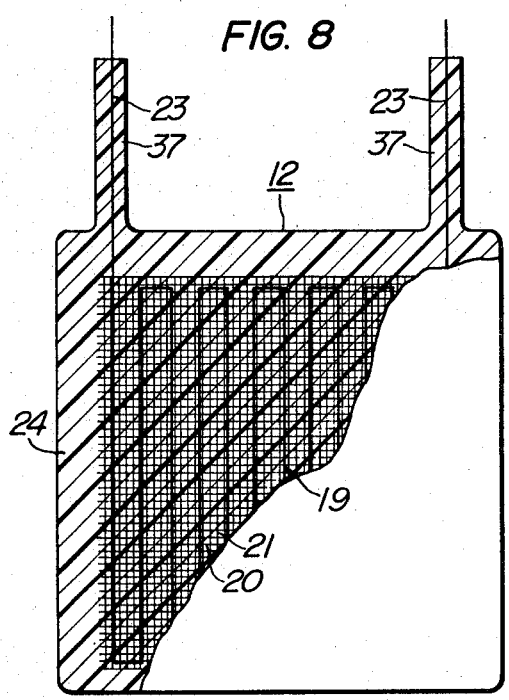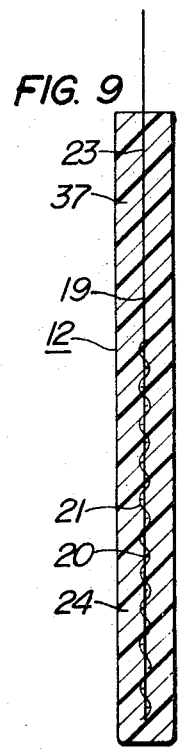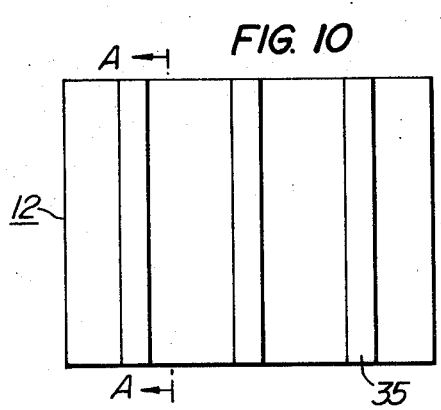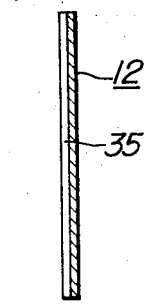

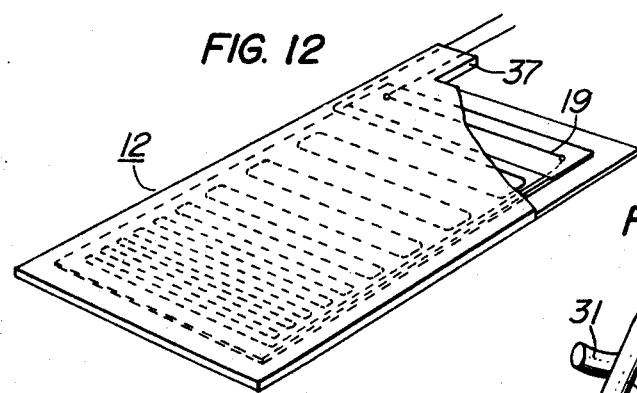
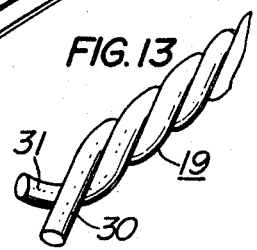
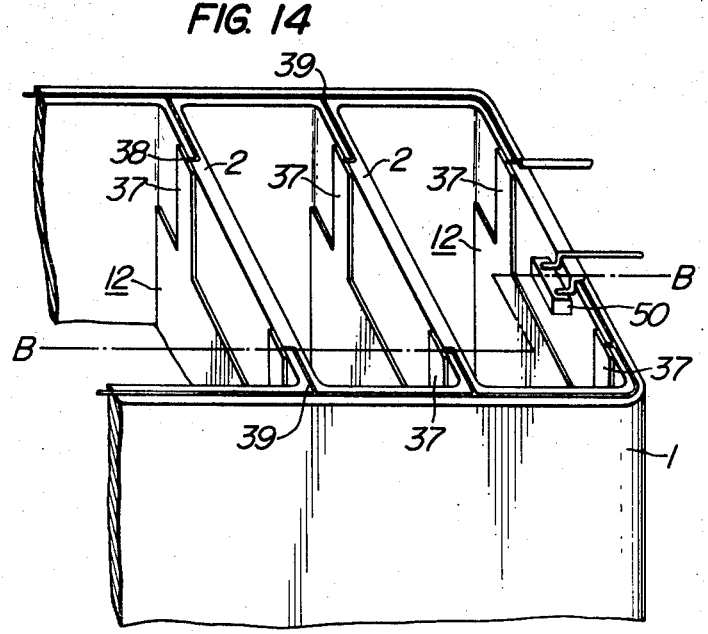

STORAGE BATTERY WITH HEATER

CROSS-REFERENCES TO RELATED APPLICATION

This application is a division of U.S. Pat. application Ser. No. 708,676 filed on Feb. 27, 1968, now U.S. Pat. No. 3,623,916.

BACKGROUND OF THE INVENTION

1. Field of the Invention

This invention relates to a storage battery, and more particularly it pertains to such battery including face heaters provided in a battery casing to effectively heat electrolyte for the purpose of preventing a decrease in the electromotive force, thereby producing a constant electromotive force.

2. Description of the Prior Art

As well known, the electromotive force of a storage battery is produced by virtue of a kind of chemical reaction. Thus, such electromotive force may be considerably decreased at low temperatures as in winter since the temperature of the battery itself, especially the temperature of the electrolyte in influenced by the ambient temperature. The reaction velocity of electrolyte depends upon temperature, and it is lowered at low temperatures so that the electromotive force is decreased. If, for example, the electromotive force is 100 at 20°C., it will be decreased down to 50 at −15°C.

Such an effect of the low ambient temperature on electrolyte can be eliminated by heating the battery in winter so that the electromotive force may be prevented from being decreased at low temperatures, thus producing a constant electromotive force all the time.

In view of such point, attempts have conventionally been made to heat a storage battery by the use of heating means.

In accordance with conventional batteries, however, such heating means is embedded in the battery casing or it is provided on the outer surface of the casing.

Obviously, the former arrangement is disadvantageous in that much trouble is experienced in forming the battery casing or it is required to replace the battery casing itself in case the heating means is partly damaged. Furthermore, the heat produced by the heating means is considerably wasted to heat the battery casing itself, which leads to a lower thermal efficiency. The latter arrangement has such drawbacks that the heat loss is so great that the thermal efficiency is low because the storage battery is internally heated through the battery casing and the heating means is exposed to the outside.

SUMMARY OF THE INVENTION

An object of this invention is to provide a storage battery in which face heaters so treated as to be of electrolyte-resistance are immersed directly in the electrolyte contained in the battery casing to effectively heat the electrolyte over a wide range thereby preventing a decrease in the electromotive force.

Another object of this invention is to provide a storage battery comprising electrode plate groups including anode plates and cathode plates, a battery casing accommodating therein said electrode plate groups and electrolyte, a closure covering said battery casing, and face heaters so treated as to be of electrolyte-resistance and provided in said battery casing.

Other objects, features and advantages of the present invention will be readily apparent from the following detailed description of certain preferred embodiments taken in conjunction with the accompanying drawings.

BRIEF DESCRIPTION OF THE DRAWING

FIG. 1 is a perspective view of a storage battery according to this invention.

FIG. 2 is a perspective view showing the lead wire connecting portion of the storage battery shown in FIG. 1.

FIG. 3 is an enlarged sectional view showing the main portion of the storage battery shown in FIG. 1.

FIG. 4 is a front view showing a group of electrode plates used in the storage battery shown in FIG. 1.

FIG. 5 is a side view thereof.

FIG. 6 is a front view showing an example of the face heater provided in the storage battery shown in FIG. 1.

FIG. 7 is a perspective view showing an example of the active material supporting means provided in the storage battery shown in FIG. 1.

FIG. 8 is a partially broken front view showing a second example of the face heater provided in the storage battery shown in FIG. 1.

FIG. 9 is a longitudinal sectional view of the face heater shown in FIG. 8.

FIG. 10 is a front view showing a third example of the face heater for use with the storage battery embodying this invention.

FIG. 11 is a sectional view taken along line A—A of FIG. 10.

FIG. 12 is a perspective view showing a fourth example of the face heater for use with the storage battery embodying this invention.

FIG. 13 is an enlarged perspective view showing a heating coil provided in the face heater.

FIG. 14 is a perspective view showing the main portion of a battery casing provided in the storage battery embodying this invention.

DESCRIPTION OF THE PREFERRED EMBODIMENT

Figure 15:
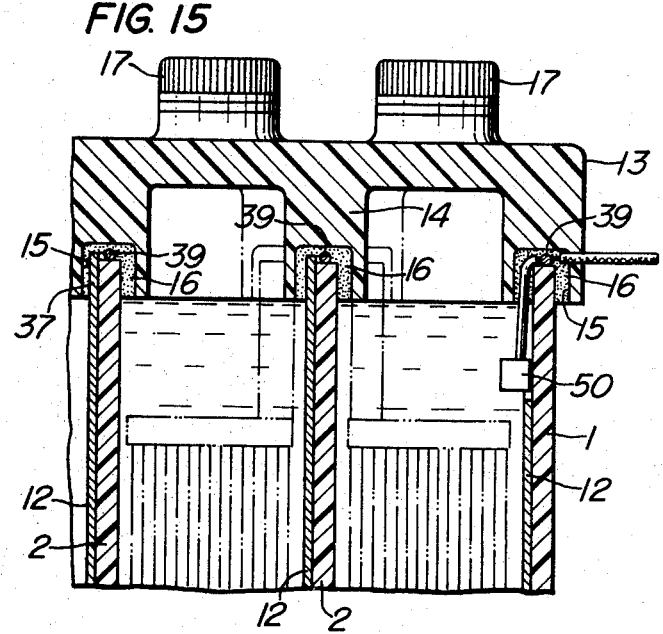
FIG. 15 is a sectional view showing the battery casing, taken along line B—B of FIG. 14 together with a closure provided on the casing.

Referring first to FIGS. 1 to 6, description will be made of the major construction of the present invention.

As shown in the drawings, a battery casing 1 is divided into a plurality of unit battery casings 3 by means of partition walls 2. In each of the unit battery casings 3 are inserted a group of electrode plates 4 including anode plates 5, cathode plates 6, separators 7 and active material supporting members 8. The active material supporting members 8 are disposed in contact with the reaction surfaces of the anode plates 5 to prevent removal of the active material thereby retaining the latter in place. Such supporting members are normally formed of a glass mat. Separators 7 are formed by an ion-permeable layer of which the surfaces are of electric insulation, and they cover from opposite sides the anode plates 5 having the opposite surfaces disposed in contact with the support members 8. That is, the separators 7 and the support members 8 are interposed between the anode plates 5 and the cathode plates 6 in such a manner that the support members 8 are disposed in contact with the anode plates 5. The reference numeral 9 represents shelves each placed in contact with the electrode plates of the same polarity of the electrode group 4, 10 electrode poles for the electrode group 4, 11 electrolyte which is contained in the unit battery casings 3 together with the electrode group 4, and 12 face heaters inserted between the opposite outermost electrode plates of each electrode group 4 and the partition walls or the inner walls of the battery casing. The reference numeral 13 denotes a closure covering the battery casing 1 and provided on the inner surface opposing the battery casing 1 and the front ends of the partition walls 2 with projections 14 which are formed with recessed grooves 15 engaged by the front ends of the partition walls 2. The reference numeral 16 indicates an insulating and electrolyte-resisting adhesive agent filled in the recessed grooves 15 to integrally and liquid-tightly fix the battery casing 1 and the closure 13 to each other, and the reference numeral 17 represents inlets for pouring the electrolyte into the unit battery casings 3.

The aforementioned face heater 12 is formed by weaving a heating wire 19 together with heat-resisting warps and wefts to form a heating cloth as shown in FIG. 6 and thereafter embedding the heating cloth in electrolyte-resisting synthetic resin 18 such as polyethylene in a sandwich-like manner. The power source for the face heaters 12 may be either the storage battery itself or a separate one.

For the heating wire of the face heater, use may be made of a conductive resistance metal wire such as stainless wire, a carbon fiber, a yarn having graphite, carbon or the like applied on the surface thereof, or the like.

Instead of the heating cloth constituting the face heater 12, use may also be made of a face resistor formed by a mixture of conductive powder such as metal powder, graphite powder or the like and a resin.

In the storage battery described above, the electrolyte 11 filled in the respective unit battery casings is directly and uniformly heated over a wide range by flowing an electric current through the face heater 12, thereby making it possible to effectively prevent the electromotive force of the storage battery from being decreased, for example, in winter.

Several examples of the face heater 12 will be described hereinbelow. Various types of construction of the face heater 12 may be possible, and therefore it is to be understood that the present invention is not limited to the examples described below.

In the example of FIG. 6, use was made of filaments of 240d made of synthetic fiber for the warps, staple yarns of 20 S/$l$ made of synthetic fiber for the wefts, and a stranded wire formed by twisting yarns twisted at a rate of 470 turns/$m$ with a heater strand for the heating wire which was woven together with the warps and the wefts.

In order to use the heating cloth thus produced, such heating cloth is impregnated with a synthetic resin so that it is embedded in the latter, it is held between two sheets of cushion base cloth such as glass mat, glass cloth or the like to cover the surfaces thereof with the latter, or it is held between two synthetic resin plates to insulate the surfaces thereof.

In the case of the face heater 12 shown in FIG. 6, the heating cloth was held between two sheets of polyvinyl chloride and made integral with the sheets by attaching the edge portions of the sheets to each other.

Then the heating cloth was embedded in polyester phtalate maleate resin as follows.

A preparation was made for two tempered glass plates of a predetermined size, and a mold releasing agent such as polyvinyl alcohol was thinly applied on the molded surfaces of the plates. Then, polyester phtalate maleate resin was applied on the glass plates having the mold releasing agent thereon as described above, and thereafter styrene monomer was sprayed onto the resin surfaces by means of a sprayer so as to remove air bubbles present in the resin. Subsequently, styrene was applied on the heating cloth after the resin solidified to such an extent that it jellified, and then the heating cloth was placed on the jellified resin. A small quantity of polyester phtalate maleate resin was uniformly applied on the heating cloth, and then styrene was applied thereon thus removing air bubbles.

Another glass plate having polyester phtalate maleate resin applied thereon was gradually placed on the heating cloth in such a manner that the jellified resin lies on the heating cloth and no air bubbles remain. Under a pressure of 1 Kg/cm$^2$, the unit was left until the inside resin jellified, and thereafter it was heated to a temperature of 60° – 80°C. and hardened in 10 – 20 minutes.

The unit was naturally cooled down to about 40°C. after having been hardened, and then the tempered glass plates on the opposite sides of the unit were removed. Thus, a complete face heater was produced.

Description will now be made of the face heater 12 shown in FIGS. 8 and 9.

In this face heater, use was made of electrolyte-resisting fiber such, for example, as glass fiber for warps 20 and an electrolyte-resisting heating wire 19 and glass fiber for wefts 21 woven together with the warps 20. More specifically, the warps 20 and wefts 21 were formed by bundling 225 pieces of glass fiber 7 microns in diameter and twisting them 1.7 times per 2.5 mm on the average. The warps 20 had the opposite end portions cut off, whereas the heating wire 19 forming part of the wefts 21 was bent, without being cut off, at the opposite ends so as to be woven in a zigzag manner. Singular power supply terminals 23, 23 are embedded in the center of an electrolyte-resisting insulator 24. In this case, thirty pieces of the warps 20 and wefts 21 may be used per 2.5 mm, and adjacent portions of the heating wire 19 may be spaced a predetermined distance (insulating distance).

Next, description will be made of an example of the case where the face heater 12 is made to be transparent. That the face heater 12 is transparent is not only advantageous in respect of the maintenance of the storage battery because it is possible to look into the inside of the battery casing when made of a transparent material but also produces such an effect as to promote the reaction of the electrolyte because the temperature of the electrolyte is raised by light rays coming in through the face heater.

In this example, the warps and wefts were prepared by bundling 225 pieces of non-alkaline glass fiber and twisting them together 1.7 times per 2.5 mm on the average. Thirty pieces of such warps and wefts were woven together with fine metal wires arranged at uniform intervals to form a cloth, which in turn was subjected to heat treatment at 340°C. for 30 hours, and the bundling agent adhering to the glass fiber was burnt to be removed. Thereafter, the cloth was cooled and applied with styrene monomer. Then it was embedded in transparent maleic polyester phtalate resin. The embedding method was such that two tempered glass plates of a predetermined size were first prepared and then a mold releasing agent such as polyvinyl alcohol was very thinly applied on the molded surfaces of the glass plates. The application of the mold releasing agent was effected in such a manner as to polish the glass plates with the mold releasing agent, thereby removing cloudiness, stains, etc. A predetermined quantity of compound maleic polyester phtalate resin (trade name, non-saturated polyester No. 8009 or 8010 produced by Dainippon Ink Kagaku Kogyo Kabushiki Kaisha) was uniformly applied on the glass plates having the mold releasing agent applied thereon, and then styrene monomer was lightly sprayed on the resin surface by means of a sprayer to remove air bubbles present in the resin which started solidification in 10-odd minutes. When the resin jellified, styrene was applied on the glass fiber cloth having the fine metal wires woven therein, and it was placed on the jellified resin. Thereafter, a small quantity of maleic polyester phtalate resin was uniformly applied on the cloth and also styrene was applied thereon to remove air bubbles. Another glass plate having maleic polyester phtalate resin applied thereon was gradually placed on the cloth in such a manner that the jellified resin lies on the cloth. Then the unit was maintained under a pressure of 1 Kg/cm² until the inside resin jellified. Thereafter, the unit was heated at 60° – 80°C. so that it was completely hardened as a whole in 10 – 20 minutes. After having been hardened, the unit was subjected to natural cooling down to about 40°C., and the tempered glass plates provided on the opposite sides thereof were removed. Thus, the complete face heater was assembled. The transparent member having the aforementioned fine metal wire embedded therein becomes transparent when the glass fiber cloth with a luster characteristic of glass fiber is embedded in the polyester resin that only the fine metal wire woven in the glass fiber cloth as part of the wefts can be seen. Thus, the transparency can be increased by 83 percent. In this case, the measurement of the transparency was performed at a wavelength of 600 millimicrons with the aid of a Beckman spectrophotometer.

Although in the foregoing the face heater 12 has been described with respect to several specific embodiments, it is to be understood that the face heater is by no means restricted to such specific embodiments. The most important point is that the heater is covered with a resin.

If a heating wire is woven together with warps in the center of a cloth formed by weaving the warps and wefts and wefts together in case use is made of only heating wire in each heating cloth as described above, the heating wire supplied from a shuttle is unwound from a bobbin or the like to become helical. Therefore, if the helical heating wire is drawn as it is, a kink (twist) will be caused in it. Weaving the heating wire in such a state tends cut off the heating wire during the weaving operation or cause the heating wire to be projected out of the resin surface in case the heating cloth is embedded in the resin, even though the weaving operation is completed with a kink imparted to the finished cloth. This results in a defective insulating coding so that the heating wire tends to be corroded by the electrolyte.

In order to avoid such drawbacks, therefore, the face heating 12 is preferably formed by the use of a heating wire 19 consisting of a heater wire 30 and a kink preventing yarn 31 which are pre-twisted in the opposite direction to the aforementioned helical direction. By doing so, the heating wire supplied from the shuttle is linearly drawn out without becoming helical, so that no kink will be caused. That is, the heater wire 30 is pre-twisted through the kink preventing yarn in the opposite direction to the helical direction. From the stand point of handling convenience, great advantage can be obtained by making the weaving density in an edge portion of the cloth more than that in the remaining portion in the formation of the face heater 12. In the case of the face heater as shown in FIG. 12, the handling of it can be facilitated by making the density of the warps in the positions where the heater wire 19 is folded back, because by doing so it is possible to prevent the cloth from wrinkling even at the folded-back portions of the heating wire 19. This also makes it possible to embed the cloth in the resin at a desired position without deformation.

Although the heating wire may be distributed uniformly at the top and bottom, it is preferable that the density of the heating wire 19 is increased toward the bottom predominantly in order to heat the deeper portion of the electrolyte, as shown in FIG. 12. By doing so, the convection effect of the electrolyte is promoted so that the heat retaining of the electrolyte can be effectively achieved and simultaneously the reaction of the electrolyte can be uniformly effected, thus increasing the electromotive force.

By providing at such a position as shown in FIG. 3 a face heater 12 which is constructed not in the form of a flat plate but in such a manner that it is formed with a plurality of longitudinal projecting strips 35 as shown in FIGS. 10 and 11, it is also possible to cause the electrolyte to freely pass through between the face heater and the electrode group 4. Thus, the electrolyte can be effectively heated so that the performance can be improved.

Each face heater 12 is provided in each unit battery casing 3 together with the electrode group 4 in such a manner that it serves also as a spacer.

However, it is to be understood that the position of the face heater 12 can be freely selected, and it is by no means limited to the above. For example, it has been found that the temperature is more greatly decreased in the battery casing side portions of the storage battery than in the other portions, and that such decrease in temperature has great effect on the decrease in the electromotive force of the battery. By providing the face heater 12 in the side portion of the battery casing 1, therefore, it is possible to retain heat predominantly in such side portion and effectively prevent decrease in the electromotive force of the storage battery.

Also, the face heater 12 can be incorporated in each partition wall 2 since it can also be used as such wall in the battery casing 1. With such arrangement, the capacity of the battery casing will never be reduced irrespective of the present of the face heater 12, so that it can be effectively utilized to advantage.

Furthermore, the face heater 12 can also be used as either the separator 7 or the active material supporting member 8 described in connection with FIG. 5. In this case, the electrode plates 5 and 6 and the electrolyte 11 are heated directly by the face heater so that heat can be effectively retained therein, thus preventing decrease in the electromotive force of the storage battery. In the case where the face heater 12 is used as the active material supporting member 8, glass mats 36, 36 are placed in contact with the opposite surfaces of the face heater 12, as shown in FIG. 7. If the face heater 12 itself has a sufficient cushioning property or if, for example, the heating cloth is held between cushion base plates, it is not necessary to superpose the glass mats 36, 36 on the face heater.

Description will now be made of the method for treating and sealing the lead wires of the face heater 12.

The face heater 12 has its ear portions 37 projected upwardly, and it is located above the partition walls 2. An example of such arrangement is shown in FIGS. 14 and 15. Terminals 38 taken out from the respective ear portions 37 are connected in parallel with each other. Said ear portions 37 are disposed in engagement with recessed grooves 15 formed in the battery closure, and thereafter an electrolyte-resisting insulating adhesive agent such as epoxy resin is filled in the recessed grooves 15, thereby fixed the closure integrally with the battery casing 1. The terminals 38 and the lead wires 39 are also protected. It will be readily apparent that the lug portions 37 of the face heater 12 may be fixed to the battery casing closure 13 instead of fixing the closure 13 to the battery casing 1.

Figure 17:
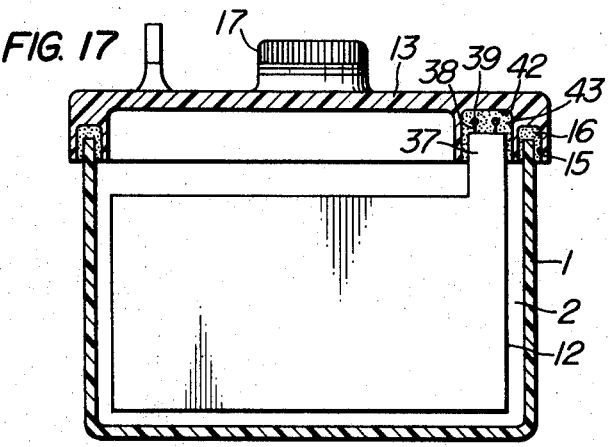
FIG. 17 is a sectional view showing a second example of the connection between the lead wires and the face heater.
Figure 18:
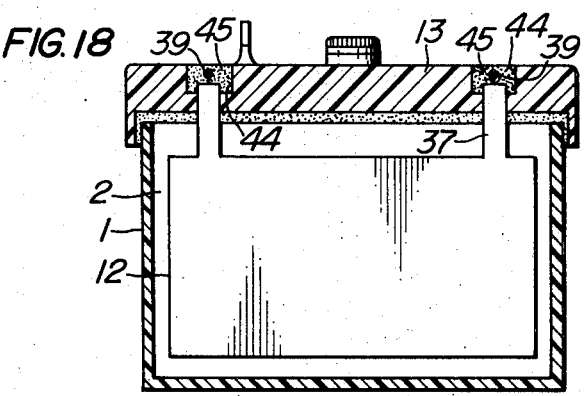
FIG. 18 is a sectional view showing a third example of the connection between the lead wires and the face heater.
Figure 19:
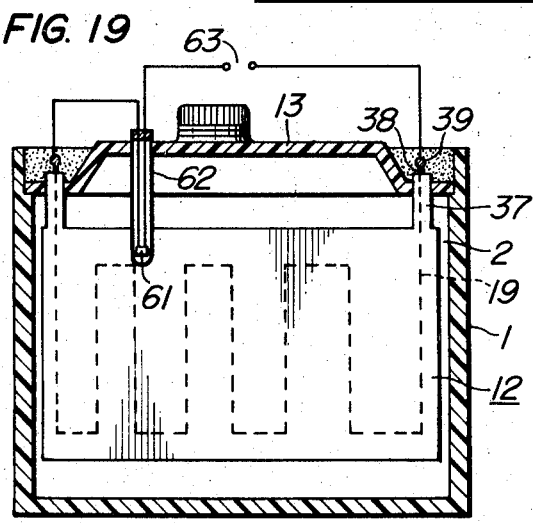
FIG. 19 is a sectional view showing the storage battery of this invention provided with a temperature controller.

Other examples of the method of sealing the lead wires are shown in FIGS. 17, 18 and 19.

Figure 16:
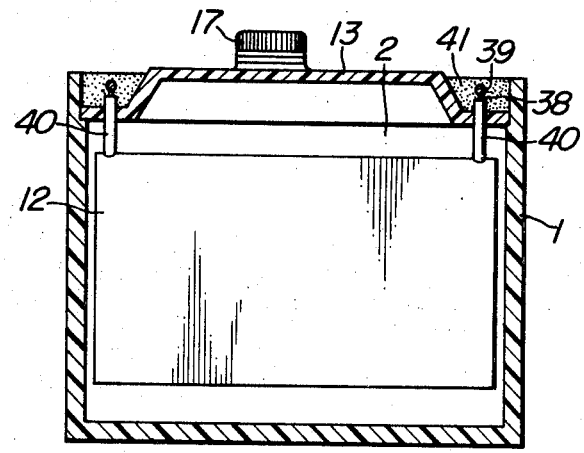
FIG. 16 is a sectional view showing an example of the connection between lead wires and the face heater.

In FIG. 16, electrolyte-resisting resin tubes 40 are thermally fixed to the face heater 12 at the opposite sides thereof and have their upper end portions projected out of the closure 13 for the battery casing 1 in the neighborhood of the side edge portions. In the resin tubes 40 are inserted terminals 38 with which are connected lead wires 39, and the connection portions are embedded in an electrolyte-resisting and insulating compound 41 formed, for example, by pitch so as to be insulated thereby.

In FIG. 17, the battery casing closure 13 is formed with a recessed groove 42 in addition to those 15 for fixing the closure 13 to the battery casing 1, and the face heater 12 has its lug portions 37 inserted in the recessed groove 42, which in turn is filled with an electrolyte-resisting and insulating adhesive agent 43 after the lead wires 39 have been connected with the terminals 38.

In FIG. 18, the lug portions 37 of the face heater 12 are caused to penetrate through the battery casing closure 13 so that the upper ends of the lug portions 37 are exposed in recessed grooves 44 formed in the upper surface of the battery casing closure 13. The recessed grooves 44 are filled with an electrolyte-resisting and insulating adhesive agent 45 after the lead wires 39 are connected with the terminals 38.

As will be seen from FIGS. 14 through 18, the face heater 12 is formed with one lug portion in some cases and with two lug portions in other cases, but it is to be understood that the essence of the present nature of the present invention is not changed by such difference.

The lead wires 39 connected with the face heater 12 are taken out through the closure 13 and connected with positive and negative terminals 46 and 47 provided on the battery casing closure 13, respectively.

Besides the above, such an arrangement shown in FIGS. 1 and 2 is also possible in which the lead wires 39 are connected with the terminals 38 of the face heater 12 in a recessed groove 48 formed in the upper surface of the battery casing closure 13, then the recessed groove 48 is filled or applied with an adhesive agent, and a cover 49 is fitted on the closure 13 through the adhesive agent to fix the connection of the lead wires thereby preventing the lead wires from being cut off and the connection from becoming defective as well as protecting the lead wires from external shock.

As described above, the face heater according to the present invention is characterized by being very thin so that the insertion of the face heater into each unit battery casing does not reduce the capacity of a conventional storage battery, and the storage battery embodying the present invention is characterized by being able to always produce a constant electromotive force even at low temperatures.

Description will now be made of the temperature controller for use with the storage battery according to the present invention.

Referring to FIGS. 14 and 15, there is provided on the inner wall of the battery casing a sealed container 50 made of an electrolyte-resisting material accommodating therein a bimetal switch connected in series with the lead wires 39. By filling an oil such for example as silicone oil in the container 50 together with the bimetal switch, it is possible to prevent the occurrence of spark in the making or breaking of the contacts thereby increasing the useful life of the switch as well as to decrease vibrations of the bimetal contacts in the case of a mobile battery. Although it is most preferable to immerse the container 50 in the electrolyte, it is also possible to provide such container on the lower surface of the battery casing closure 13 or embed it in a sealing compound.

The bimetal switch accommodated in the afore-mentioned container 50 is so designed that its contacts are opened if the electrolyte is unnecessarily overheated thereby preventing the power from being wastefully consumed and the electrolyte from being evaporated.

Figure 20:
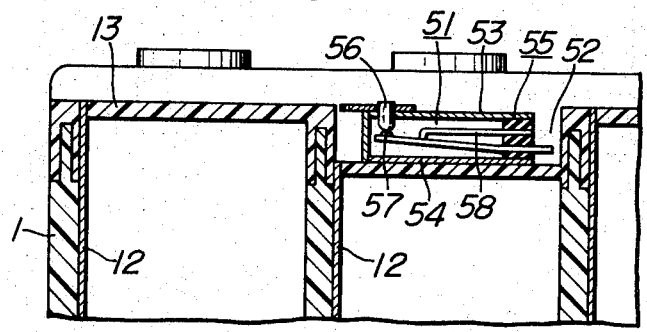
FIG. 20 is a sectional view showing the main portion of the storage battery provided with a different temperature controller.
Figure 21:
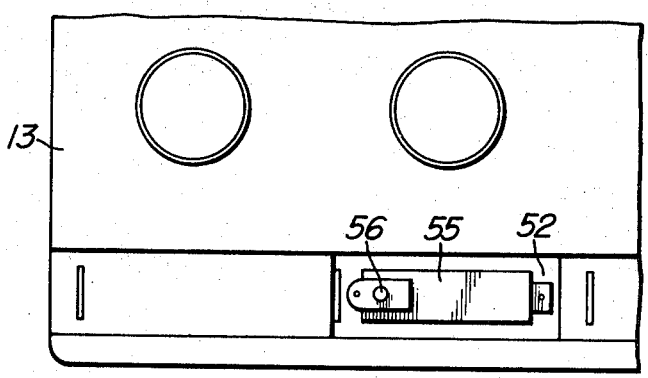
FIG. 21 is a top plan view of FIG. 20.
Figure 22:
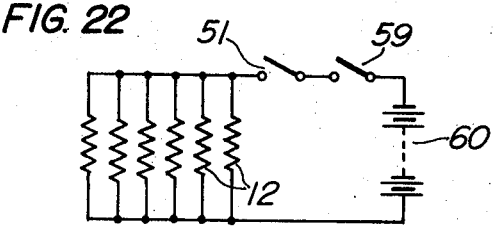
FIG. 22 is a diagram showing the circuit arrangement of each of the storage batteries shown in FIGS. 20 and 21.

Other examples will be described with reference to FIGS. 20, 21 and 22. The reference numeral 51 represents a thermostat provided in a recessed groove 52 formed in the battery casing closure 13, and it comprises a case 55 including a conductive cover 53 and a bottom plate 54, a fixed contact 56, a movable contact 57 energized so as to be normally disposed in contact with the fixed contact 56, and a bimetal 58 adapted to cause the movable contact 57 to be disposed out of the fixed contact 56 when it is bent. The fixed contact 56 is connected with one of the terminals of the face heater 12, and the movable contact 57 is connected with the other terminal of the face heater 12 through switch 59 and power source 60.

Thus, by supplying power to the face heater with the switch closed, the electrolyte is heated thereby, so that the electromotive force of the storage battery can be prevented from being decreased at low temperatures. The temperature within the battery is transmitted also to the thermostat 51 through the battery casing closure 13, and if such temperature is excessively raised, the bimetal 58 is bent to bring the movable contact away from the fixed contact, thereby interrupting the power supply to the face heater 12.

Since the battery casing closure 13 is usually made of a material of a low heat conductivity such as bakelite, ebonite or the like, it is required that the spacing between the fixed contact 56 and the movable contact 57 and the expansion coefficient of the metal forming the bimetal 58 be selected accordingly. FIG. 22 shows an example of the electric circuit in which the respective face heaters 12 are connected in parallel with each other and the thermostat 51, the switch 59 and the power source 60 are connected in series with the parallelly connected face heaters 12.

The switch 59 described above is not essentially required, while it may be provided on the top of the battery casing closure 13 as shown in FIG. 2.

Although in the foregoing description mention has been made of the case where the bimetal is used as the temperature controller, it is possible to produce a similar effect by the use of a posistor instead of the bimetal.

In FIG. 19, the reference numeral 61 represents a posistor accommodated in a container 62 which is liquid-tightly provided on the battery casing closure 13, and located in the electrolyte. The posistor 61 is connected with power source 63 and terminals 38 of the face heater 12.

Since the posistor 61 described above has such a nature that it represents a low electric resistance when the ambient temperature is low while it represents a high electric resistance when the ambient temperature is high, the power supply to the face heater 12 can be controlled in accordance with variations in the ambient temperature as in the case where a bimetal is used, so that the electrolyte can be maintained at a predetermined temperature, thereby preventing the electromotive force from being decreased.

As will be appreciated from the foregoing, with the storage battery according to the present invention, it is possible to prevent the electromotive force from being decreased even at low temperatures as in winter, so that a constant electromotive force can always be produced.

We claim:

1. A storage battery comprising electrode plate groups including anode plates and cathode plates, electrolyte, a battery casing for accommodating therein said electrode plate groups and said electrolyte, a battery casing closure covering said battery casing and face heaters for heating said electrolyte; wherein said face heaters comprise a heating wire formed from a resistance wire and kink preventing yarn twisted together, and a heat-resistant cloth of said heating wire woven together with heat-resistant wefts and warps, said face heaters being electrolyte-resistant and interposed between said electrode plate groups and partition walls dividing the inside of said battery casing in close contact therewith; lead wires connected with said face heaters being disposed in a recessed groove of said battery casing closure provided confronting with the open end of said battery casing and said partition walls, and means insulating said lead wires in said recessed groove, said lead wires being connected with a power source.

2. A storage battery as defined in claim 1, wherein said face heaters have a high weave density portion formed in one edge portion of said heat-resistant cloth with said heating wire woven thereinto.

3. A storage battery as defined in claim 1, wherein said heating wire is distributed more densely toward the bottom than the top of said face heaters.

4. A storage battery as defined in claim 1, wherein said lead wires connected with said face heaters are embedded in an insulating and electrolyte-resistant adhesive means, said adhesive means adhering said battery casing closure to said battery casing.

5. A storage battery as defined in claim 1, wherein said lead wires connected with said face heaters are embedded in a sealing compound for sealing said battery casing and said battery casing closure.

* * * * *